US006464483B1

(12) United States Patent
Lichtinger

(10) Patent No.: US 6,464,483 B1
(45) Date of Patent: Oct. 15, 2002

(54) DEVICE FOR RECEIVING AND CONVEYING MOLDED PARTS

(75) Inventor: Peter Lichtinger, Fürstenfeldbruck (DE)

(73) Assignee: Krauss-Maffei Kunststofftechnik GmbH, Munich (DE)

( * ) Notice: Subject to any disclaimer, the term of this patent is extended or adjusted under 35 U.S.C. 154(b) by 0 days.

(21) Appl. No.: 09/622,973

(22) PCT Filed: Mar. 6, 1999

(86) PCT No.: PCT/EP99/01456

§ 371 (c)(1),
(2), (4) Date: Aug. 24, 2000

(87) PCT Pub. No.: WO99/44799

PCT Pub. Date: Sep. 10, 1999

(30) Foreign Application Priority Data

Mar. 6, 1998 (DE) .......................................... 198 09 723

(51) Int. Cl.⁷ .......................... B29C 31/00; B29C 45/14
(52) U.S. Cl. ..................... 425/116; 264/277; 425/123; 425/126.1; 425/129.1
(58) Field of Search ............................... 425/DIG. 201, 425/110, 116, 117, 126.1, 129.1, 121, 123, 127; 264/277

(56) References Cited

U.S. PATENT DOCUMENTS

| 4,005,965 A | | 2/1977 | Roczynski et al. | ......... 425/315 |
| 4,519,767 A | | 5/1985 | Westerman | ......... 425/308 |
| 5,238,377 A | * | 8/1993 | Adkins et al. | ......... 425/116 |
| 5,558,883 A | * | 9/1996 | Shinada et al. | ......... 425/116 |

FOREIGN PATENT DOCUMENTS

| DE | 20 07 936 A | 9/1970 |
| DE | 195 42 102 A | 5/1997 |
| EP | 0 449 002 A | 10/1991 |
| GB | 1 105 480 A | 3/1968 |
| GB | 2 065 544 A | 7/1981 |
| GB | 2 093 757 A | 9/1982 |

OTHER PUBLICATIONS

Patent Abstracts of Japan, vol. 009, No. 213 (M–408) Aug. 30, 1985 & JP 60 071405A (Seiko Denshi Kogyo KK), Apr. 23, 1985.
Patent Abstracts of Japan, vol. 004, No. 177 (P–039) Dec. 9, 1980 & JP 55 120008 A (Fujitsu Ltd.) Sep. 16, 1980..

* cited by examiner

Primary Examiner—Jan H. Silbaugh
Assistant Examiner—Emmanuel S. Luk
(74) Attorney, Agent, or Firm—Henry M. Feiereisen

(57) ABSTRACT

The invention relates to a device for receiving and transporting molded parts in order to especially permit the removal of plastic molded parts produced in injection molding machines from the cavities, and to permit the transport of the molded parts through a number of work stations, without the use of separate handling systems. According to the invention, circulating transfer frames are provided from which retaining elements project and reach into the cavity to closely abut the mold. The molded part is bonded to the retaining element during injection molding of the molded part and is thus fixed in the transfer frame for transport to additional work stations. The molded part is removed from the retaining elements at the end of the transport line. In a modification, the molded part is molded directly or via intermediate pieces onto a circulating rope or a chain conveyor, or on rods mounted on a rope.

35 Claims, 9 Drawing Sheets

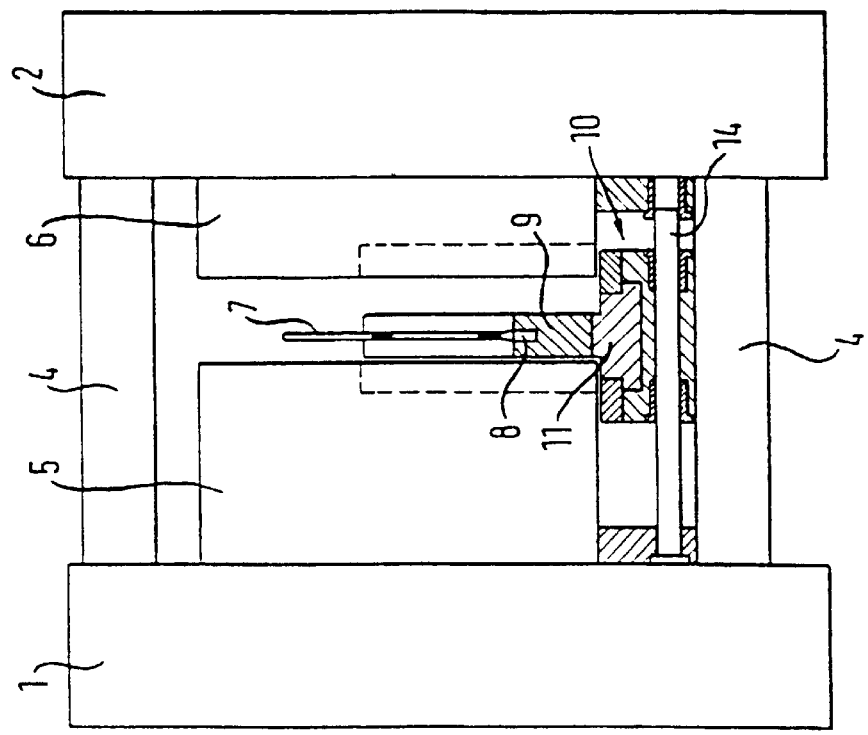
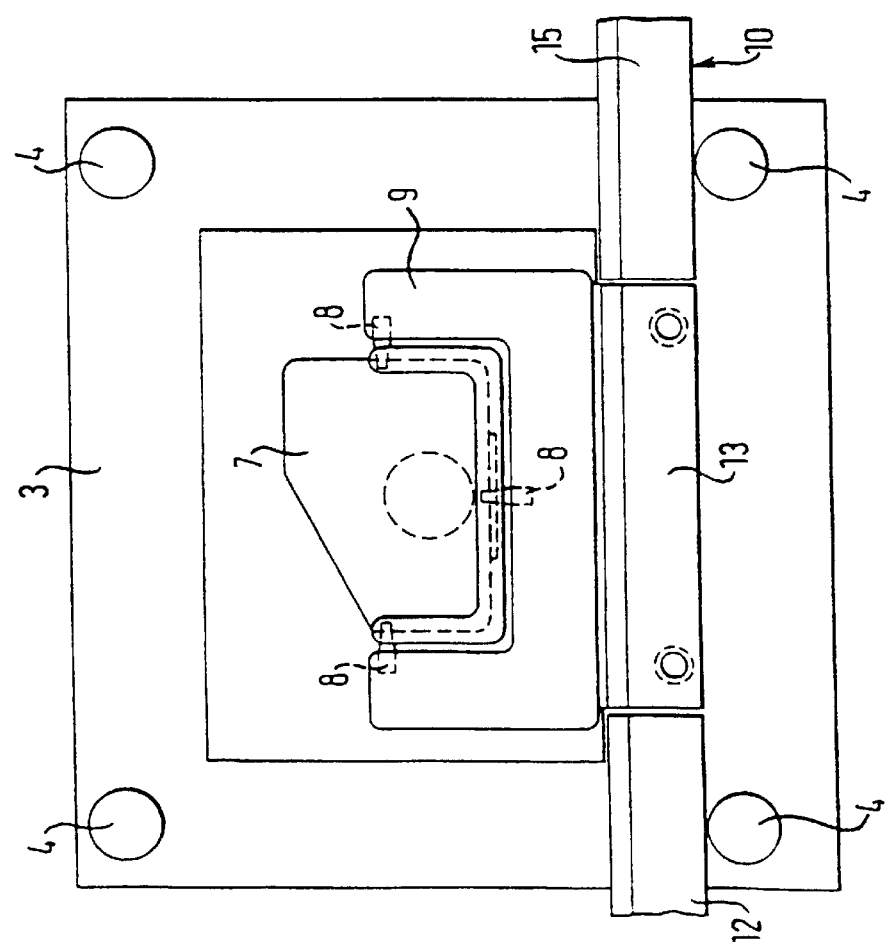
Fig. 1

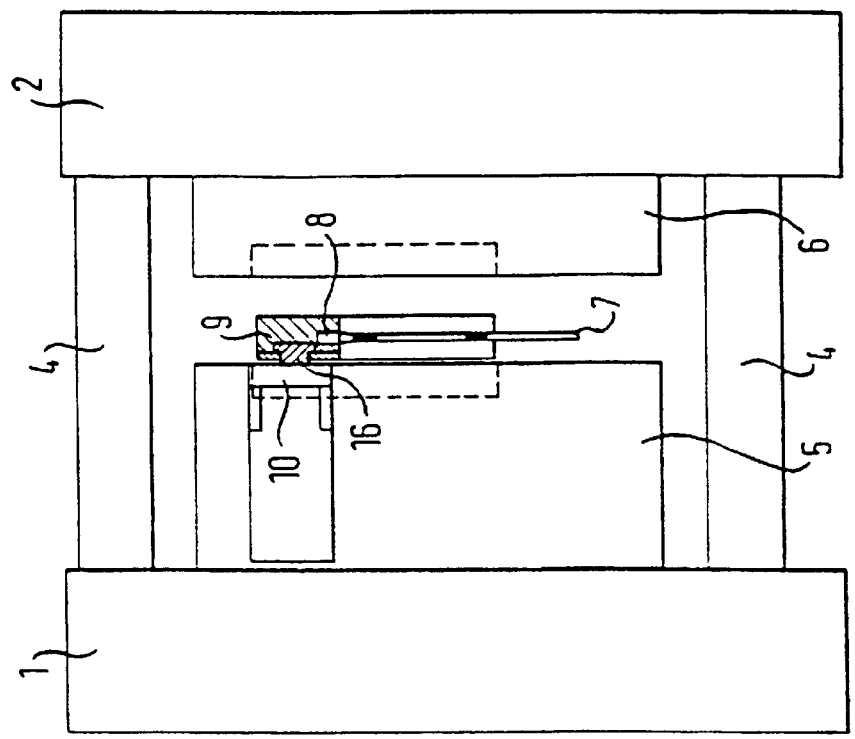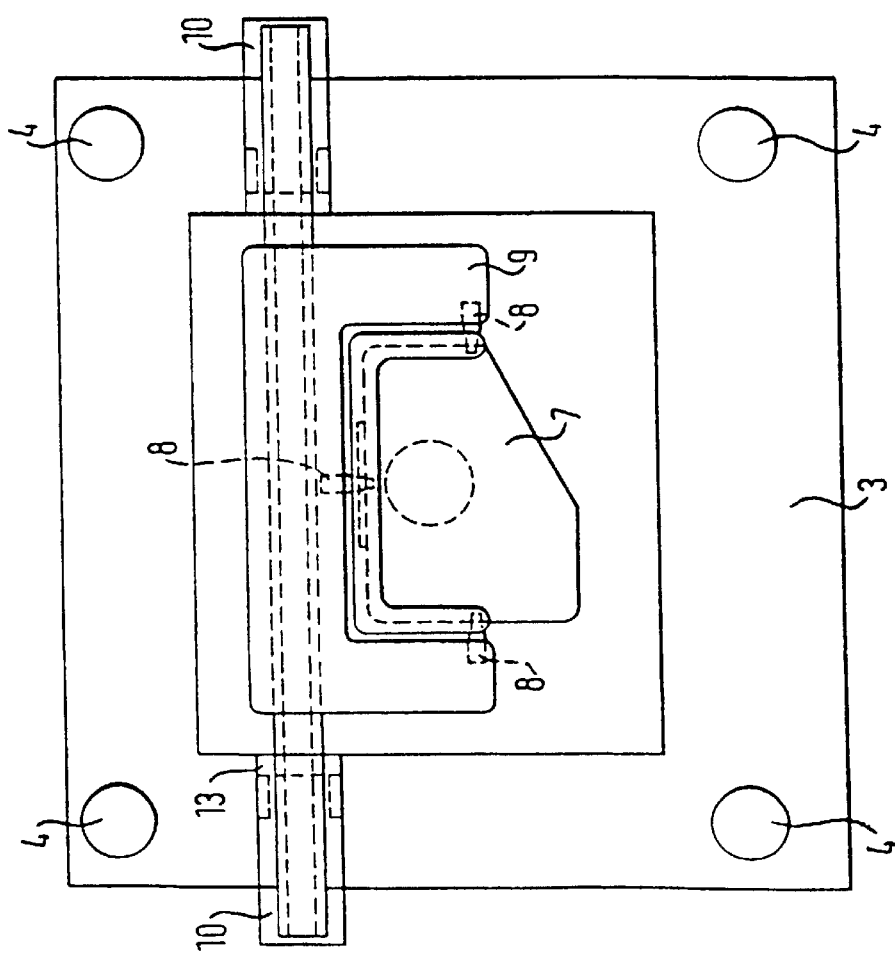
Fig. 2

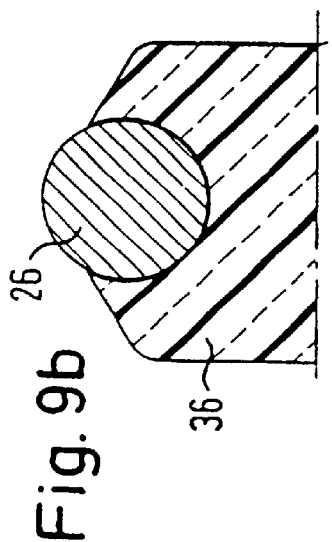
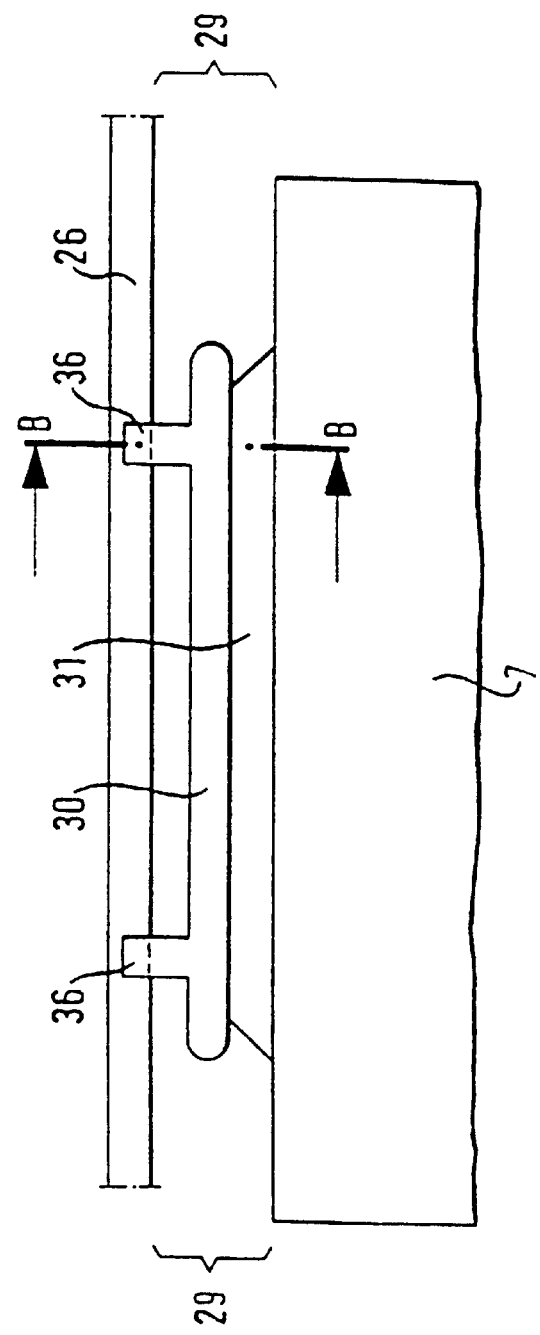

DEVICE FOR RECEIVING AND CONVEYING MOLDED PARTS

BACKGROUND OF THE INVENTION

The invention relates to a device for receiving and transporting molded parts made in cavities, in particular plastic molded parts, through a production line (processing line) with several work stations. Preferred field of application of the invention is the production of high-quality, flat plastic parts, in particular the production of plastic panes.

It is known from the prior art to use a so-called index plate for producing molded parts with several components in a work station of a machine for processing plastic material, whereby the index plate is used to transfer the molded parts between the individual cycles within this work station. The index plate is configured as transfer frame and includes retaining elements on which the molded part is initially formed on and transferred therewith. Removal of the molded parts is realized by moving the retaining elements away from the molded part which is then withdrawn by a separate handling system or falls out of the work station. In a two-cycle machine, the index plate turns from the first cycle to the second cycle by 180°, at several cycles with respectively shorter turns. In any event, the index plate with its retaining elements remains in this work station.

The invention is now based on the object to provide a device by which molded parts, in particular plastic molded parts, made in cavities, can be removed from the cavities and transported through several work stations.

SUMMARY OF THE INVENTION

According to one aspect of the invention, the molded parts can travel through a production line with several work stations, without requiring contact with the molded part itself. This is especially of importance when manufacturing high-quality plastic panes because any adverse effect in quality or damage to the surface can be eliminated, when avoiding a contact therewith. In accordance with the invention, it is hereby proposed to use a transfer frame which travels through the production line and includes retaining elements on which the molded part in the cavity is formed. The transfer frame is then removed together with the molded part from the respective work station and can be further transported along the processing line. Hereby, it is necessary to provide the molds in the area of the retaining elements with recesses in correspondence to the contour of the retaining elements, so that the latter closely abut in a form-fitting manner the mating surfaces of the mold halves, when the mold is closed. Care should be taken that the retaining elements so project into the space between the mating surfaces as to realize a bond with the molded parts during production of the molded parts.

According to one embodiment of the invention, linear guides with respective guide rails may be provided for the transport of the transfer frame through the processing line. The transfer frames may be transported through the processing line on the guide rails in upright disposition or suspended disposition. As an alternative, the embodiments provide for gripper arms having grippers for moving the transfer frames.

The manufacture of flat plastic parts by means of an injection compression process with dipping peripheral dies requires measures to detach the molded parts from the fixed or the moving mold half. Accordingly, the linear guide in the area of the mold halves includes segments which are movable orthogonal to the partition plane of the mold halves. The segments may be configured, for example, as a compound table. For implementing a smoothest possible run of the transfer frame on the linear guide, the linear guide is implemented as ball-type linear guide.

The use of the invention for the preferred field of application requires the provision of retaining elements which can be attached to the edge of the pane and easily separated therefrom again. The retaining elements may have particularly configured pointed ends for engagement into the edge of the pane. In order to be movable away from the panes, the retaining elements are slidingly supported in the transfer frame and can be displaced therein by suitable means.

According to another aspect of the invention, transfer frames and retaining elements can be completely eliminated. Rather, a linear transport system, for example a transport rope, is used for receiving as well as transporting the molded parts. The transport rope thus assumes a dual function and replaces the transfer frame and the retaining elements. In this case, the transport system engages directly into the cavities, and the molds are provided in the area of the linear transport systems with recesses in correspondence to the cross section of the linear transport systems, so that the latter effect a form-fitting seal with the mating surfaces of the mold halves, when the mold is closed. According to a particularly advantageous embodiment, a rope is used which is embraced by the molded part, when being formed thereon, only to such an extent that its cross section is not completely embraced. The molded part can then easily be pushed off the rope. The use in the injection compression process, i.e. when using dipping peripheral dies, it is advantageous to provide one or more stroke elements by which the linear transport systems can be moved orthogonal to the transport direction in order to detach the molded parts from the fixed or the moving mold half.

The present invention is suitable for single component injection as well as, in particular, for multi-component injection of plastic molded parts. The invention is usable in horizontal as well as vertical injection molding machines or injection compression machines. Especially suitable is the invention for the production of also large-area, flat plastic parts with extreme, optical surface properties. Moreover, the invention permits the use of a small mold opening space which can be kept more easily under clean air conditions. Therefore, it is possible to easily operate at clean air conditions. Furthermore, the invention provides for a high degree of freedom with respect to the constructive configuration of the plastic parts because random components can be attached by injection onto the main plastic part, either completely or partially and one-sided or two-sided, or fully one-sided (overlay). Moreover, the device according to the invention permits the use of short cycles.

BRIEF DESCRIPTION OF THE DRAWING

Exemplified embodiments of the invention will now be described in more detail with reference to FIGS. 1 to 10b, in which:

FIG. 1 shows a cross section (left) and a side view (right) of a second embodiment of the invention in the area of a work station with bottom guide rail and upright transfer frame;

FIG. 2 shows a cross section (left) and a side view (right) of a first embodiment of the invention in the area of a work station with overhead guide rail and suspended transfer frame;

FIGS. 9a to 9b show details of the bond of a plastic pane upon the transport rope;

DETAILED DESCRIPTION OF PREFERRED EMBODIMENTS

Figure 3:
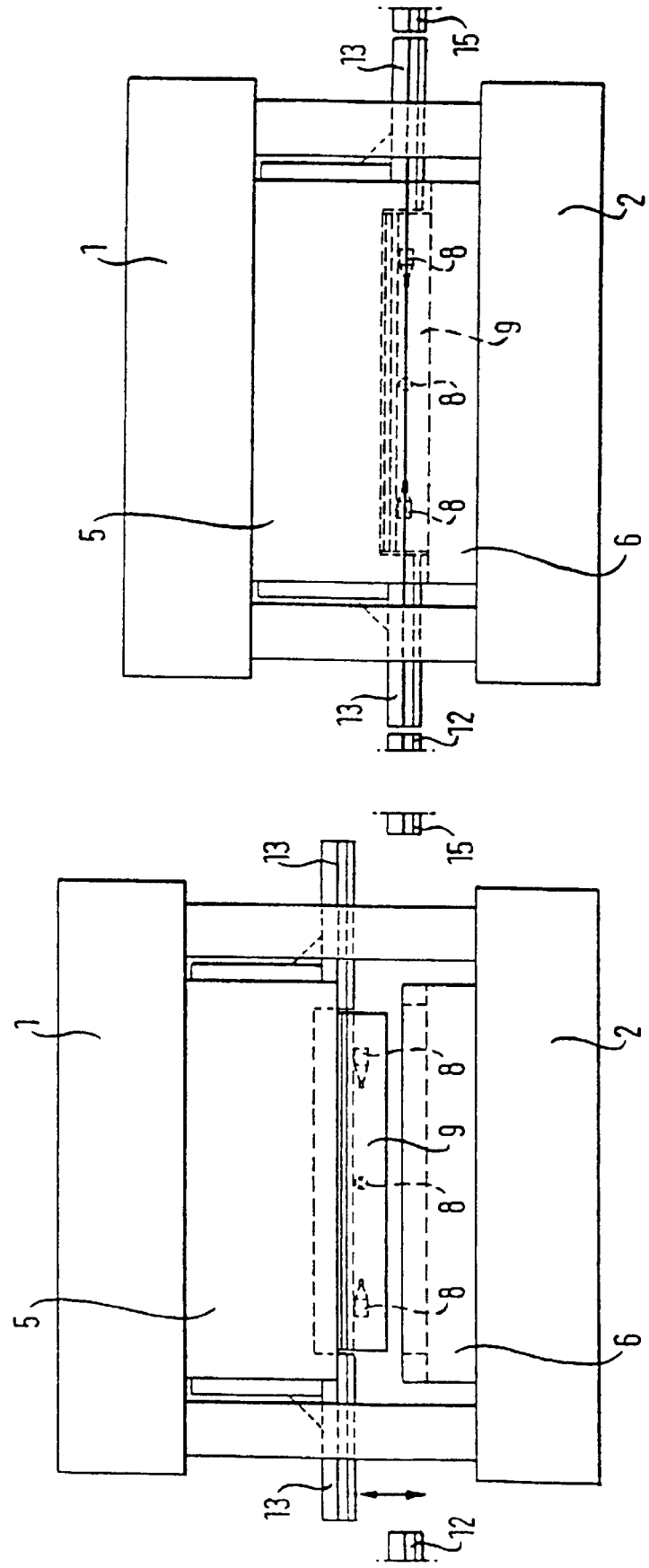
FIG. 3 is a plan view of a work station with open (left) and closed (right) mold.

The following exemplified embodiments relate to the production of plastic panes, as used, for example, as side window panes for passenger cars. The invention is, however, not limited thereto, but is generally applicable for the production and processing of molded parts made in cavities.

FIG. 1 shows a plastic processing machine with a moving and a fixed mold clamping platen which are guided along four rods 4 arranged on a machine frame 3. Mold halves 5 and 6 are disposed on the mold clamping platens 1, 2 and form a cavity, when closed for introduction of plasticized plastic material and compressing to a pane 7. Provided in the mold halves are recesses for snug fit engagement of the retaining elements 8 so as to effect a form-fitting seal with the mating surfaces of the mold halves, when the mold is closed. The retaining elements 8 are mounted in a transfer frame 9 which remains outside the mold contour, when the mold halves are closed. Upon its manufacture, the pane is formed on the retaining elements 8 and can subsequently be withdrawn with the transfer frame 9 from the work station for transport to further work stations. The movement of the transfer frame is implemented via a guide rail 10 having a T-shaped recess for engagement of the T-shaped foot piece 11 of the transfer frame 9. In order to manufacture a pane 1, an empty transfer frame 9 is initially readied in an entry station 12 with its retaining elements 8, and—after the preceding transfer frame has left the work station—pushed onto the segment 13 which can be moved orthogonal to the transport direction on a rail 14. The segment 13 with the transfer frame 9 travels to the moving mold clamping platen 1 and is accurately positioned there in place. This is important in particular when using dipping peripheral dies to insure a clean interlocking of core and female mold member. Subsequently, the moving mold clamping platen with the core and the cavity-engaging retaining elements 8 (thus also with the transfer frame 9) are moved in the direction of the fixed mold clamping platen 2. As soon as the cavity is closed, plasticized plastic material can be introduced and a compression stroke can be executed. After conclusion of the injection compression process and sufficient solidifying of the pane 1, the mold is opened and the guide rail segment 13 with the transfer frame 9, on which the pane 7 is now attached via the retaining elements 8, are moved in alignment between the entry station 12 and the exit station 15. The transfer frame 9 with the pane 7 can now leave this work station and be transferred to further work stations, for example, for spray-coating further components or for a surface treatment of the pane. Displacement of the transfer frame 9 may be implemented by hydraulic and/or pneumatic piston and cylinder units which push the empty transfer frame 9, positioned at the entry station 12, into the work station, and, at the same time, move the preceding transfer frame with the finished pane 7 out of this work station. Hereby, the transfer frames 9 are provided with foot pieces 11 of sufficient length, or with respectively long intermediate pieces.

In contrast to FIG. 1, the embodiment according to FIG. 2 shows suspended transfer frames 9 which are shifted along an overhead guide rail 10. Therefore, the pane 7 is molded onto the retaining elements 8 and the transfer frame 9 in suspended state. In this case, the guide rail 10 has a T-shaped cross section 16, and the transfer frame 9 includes a complementary T-shaped recess for engagement of the T-piece of the guide rail. The mode of operation and the movement of the transfer frames correspondents to the exemplified embodiment of FIG. 1.

FIG. 3 shows a top view of the work station, with the movable segment 13 of the guide rail 10 positioned at the core, when the mold is opened (left illustration) and closed (right illustration). In the left illustration, the movable segment 13 is shifted from the entry station 12 and the exit station 15 in the direction of the moving mold clamping platen. When the mold is closed (right illustration), the segment 13 is in alignment with the entry station 12 and the exit station 15. This, however, is not necessarily required, i.e. the entry station 12 and the exit station 13 may also be positioned differently as the segment 13 is randomly movable between the moving and the fixed mold clamping platens.

Figure 4:
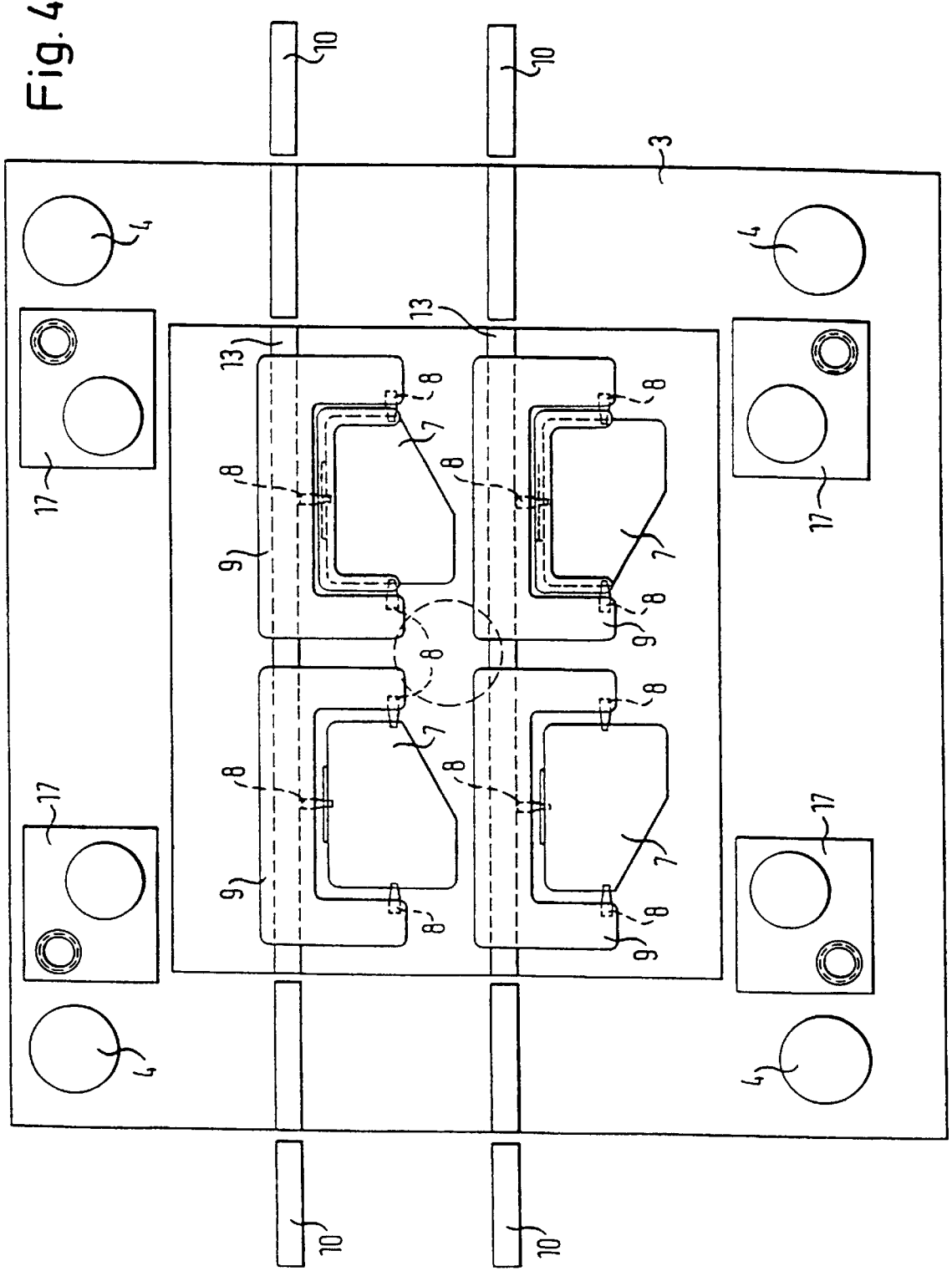
FIG. 4 shows a work station for simultaneous manufacture of two panes with two components with two overhead guide rails and suspended transfer frame.

FIG. 4 shows a work station for the simultaneous production of two panes by means of a multi-component injection compression process. Two guide rails 10 are arranged above one another for the suspended transport of the transfer frames 9 with the panes 7 molded onto the retaining elements 8, and extend across through the machine frame 3. In order to realize a clean and parallel travel of the mold clamping platens toward one another, four synchronizing devices 17 are provided which measure in their sphere the respective distance of the mold clamping platens from one another and readjust accordingly in response to the measuring result transmitted by an evaluating unit. For movement of the transfer frame 9 between the mold clamping platens, the segments 13 of the guide rail 10 are supported for movement orthogonal to the transport direction. Like in the exemplified embodiments according to FIGS. 1 to 3, the transfer frames 9 are also in this case in ready position at the entry station 12 when empty and shifted into the space between the mold halves, when the mold is open. After completing the pane, an empty transfer frame 9 is pushed ahead, the transfer frame 9, charged with the pane 7, is forced out of the work station to leave the first work station at the exit station 15. Through a further cycle pulse (pushing ahead of empty transfer frames 9), the charged transfer frames 9 are pushed further along the guide rails 10 and reach at a later time a next work station.

Figure 5:
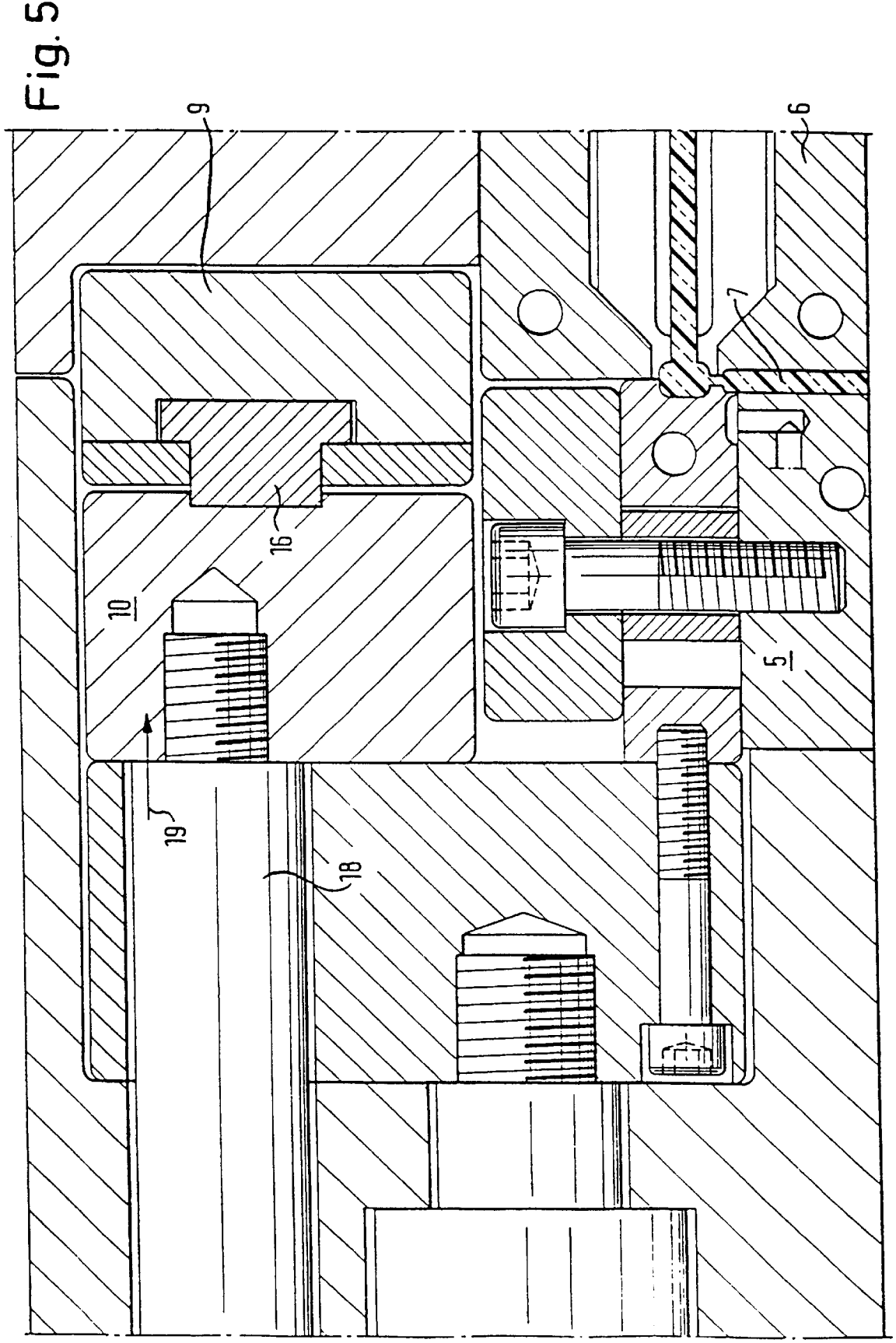
FIG. 5 is a detailed illustration (in cross section) of a suspended or upright transfer frame.

FIG. 5 shows a cross section of a suspended transfer frame 9 which depends from a guide rail 10 with a T-shaped guide element 16. In this case, the transfer frame 9 includes a complementary T-shaped recess. The guide rail 10 is configured in the area of the mold clamping platens as carrier plate for the transfer frame and is connected to a piston and cylinder unit 18, so that a stroke in the direction of the arrow 19 can be executed, so that the pane 7 can be detached from the moving mold clamping platen 1 or the core 5. Subsequently, the transfer frame 9 returns with the pane 7 on the movable segment 13, not shown here, to the starting position and is ejected by pushing ahead an empty transfer frame 9 from the work station. For better understanding, the retaining elements 8 have not been shown here. They may be positioned, for example, outside of the plane of projection. FIG. 5 represents essentially a detailed view of the right illustration of FIG. 2.

Figure 6A:
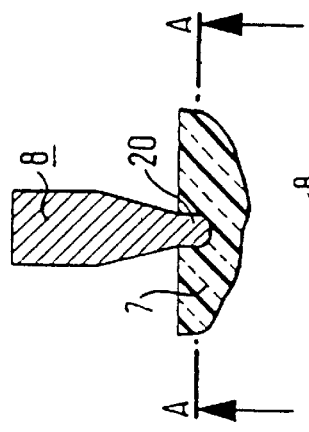
FIGS. 6a to 6h show various embodiments of the retaining element.
Figure 6B:
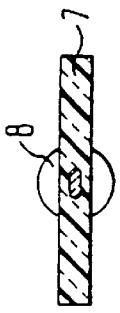
Figure 6C:

FIG. 6a shows a cross section of a first embodiment of the bond of the pane 7 to the retaining elements 8. A pointed end 20 is hereby provided which includes an elongate cross section (FIG. 6b) or a cylindrical cross section (FIG. 6c). FIGS. 6b and 6c shows sectional views, taken along the line A—A in FIG. 6a.

Figure 6D:
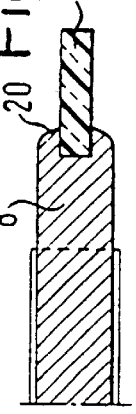
Figure 6E:
Figure 6F:

FIGS. 6d to 6f illustrate a second embodiment of the retaining elements 8 which include a pointed end 20 with a U-shaped recess which is penetrated by the plasticized plastic material, so that the finished pane 7 is embraced by the pointed end 20 of the retaining element 8. To prevent a lateral slipping of the pane, a centering groove 21 or a centering ridge 22 may be provided in the U shaped recess of the pointed end 20 (FIGS. 6e and 6f).

Figure 6H:
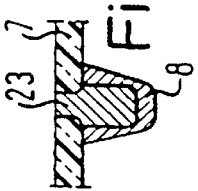
Figure 6G:
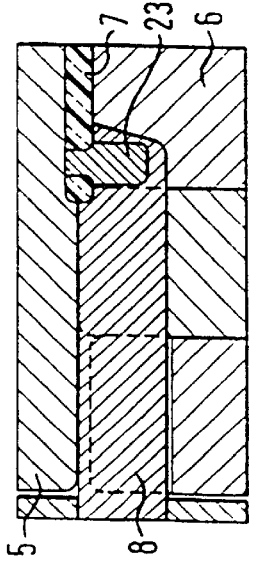

FIGS. 6g and 6h show a further embodiment of the retaining element 8 in which a pin 23 is embedded in the end of the retaining element 8 and embraced by the pane 7. FIG. 6g further shows that the mold halves 5 and 6 are provided in the area of the retaining element 8 with recesses and closely bear upon one another when being closed, so that plastic material is prevented from escaping the cavity.

Figure 7:
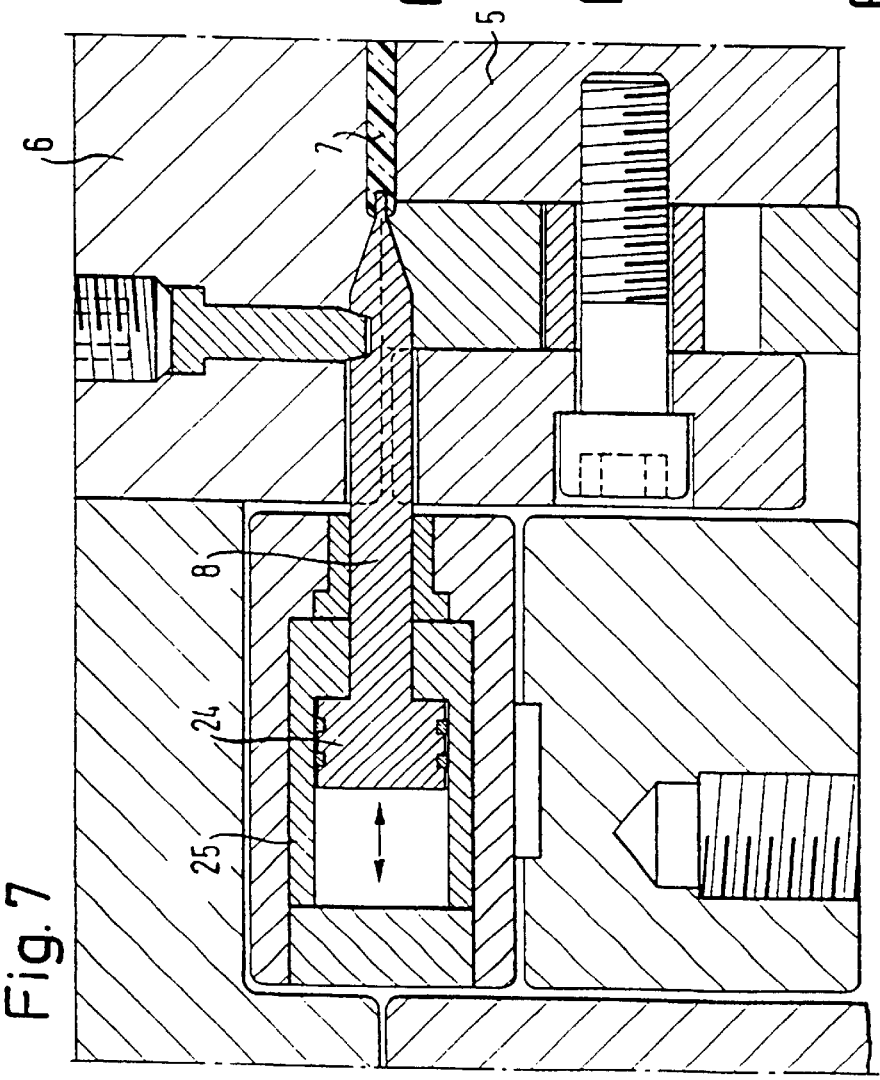
FIG. 7 shows a transfer frame with integrated piston and cylinder unit for the retaining element.

According to FIG. 7, the retaining element 8 includes a head piece 24 which assumes the function of a piston and is accommodated in a cylinder 25, thereby forming a piston and cylinder unit 24, 25 by which the retaining element 8 is movable in the transfer frame and detachable from the pane 7, for example, to withdraw the finished part 7 from the transfer frame 9 at the end of the production line.

Figure 8:
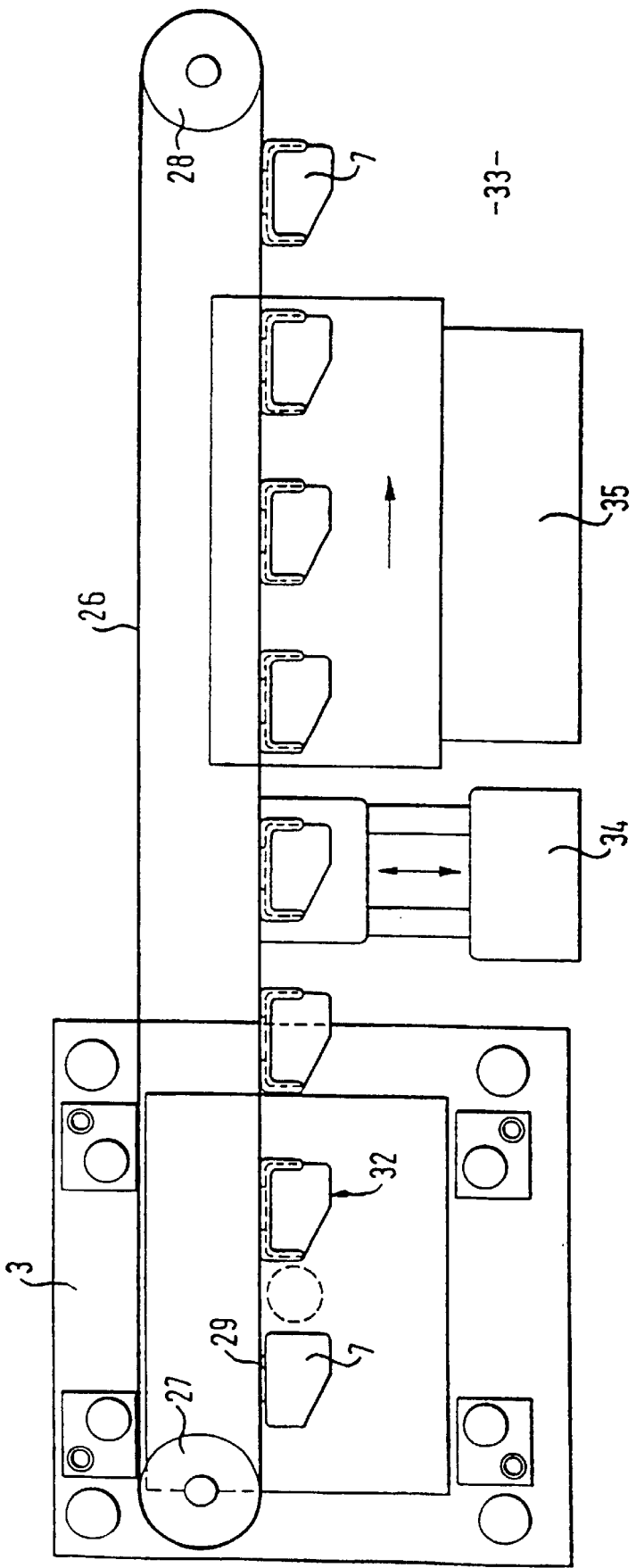
FIG. 8 shows a further embodiment of the invention with a transport rope for receiving and transporting the molded parts.

An alternative embodiment of the device according to the invention is illustrated in FIG. 8 and includes a transport rope 26 which is guided over two deflection pulleys 27 and 28, with one of the deflection pulleys including a drive. The lower part of the transport rope 26 is guided through the mold which is thereby provided with recesses of a cross section corresponding to the cross section of the transport rope 26. When the mold halves are closed, the transport rope 26 extends within the cavity and effects a form-fitting seal with the mating surfaces of the mold halves. When injecting the plasticized plastic material at closed cavity and compressing the pane, the pane 1 becomes attached via the sprue 29, comprised of a cylindrical manifold 30 and a film gate 31. After molding the pane 7 onto the transport rope 26, the mold halves open, and the pane 1 can be detached from one of both mold halves. The transport rope travels then with the attached molded part to the two-cycle injection process in the first work station. Subsequently, the transport rope 26 is moved further by an increment in order to position again an empty segment of the transport rope in the first cavity. By simply circulating the transport rope 26, the panes 7 can be fed to further work stations and finally removed at a withdrawal station 33. For example, a hard silicate layer can be applied in a coating machine on the pane 7. Curing of the pane 1 with the silicate coat is realized in a following drying station 35.

FIG. 9a shows, on an enlarged scale, a pane 7 molded onto the transport rope 26, so that the sprue 29, comprised of manifold 30 and a film gate 31, is clearly recognizable. FIG. 9b shows a cross section, taken along the line B—B. As can be seen from the Figure, the sprue element 36, projecting out from the sprue 29, embraces the transport rope 26 by slightly more than a half, so that a secure seat of the sprue element 36 and thus a good fit of the pane 7 is ensured, on the one hand. On the other hand, this configuration realizes that the entire molded part can easily be pushed away downwards and detached from the transport rope 26 at the withdrawal station 33.

Figure 10A:
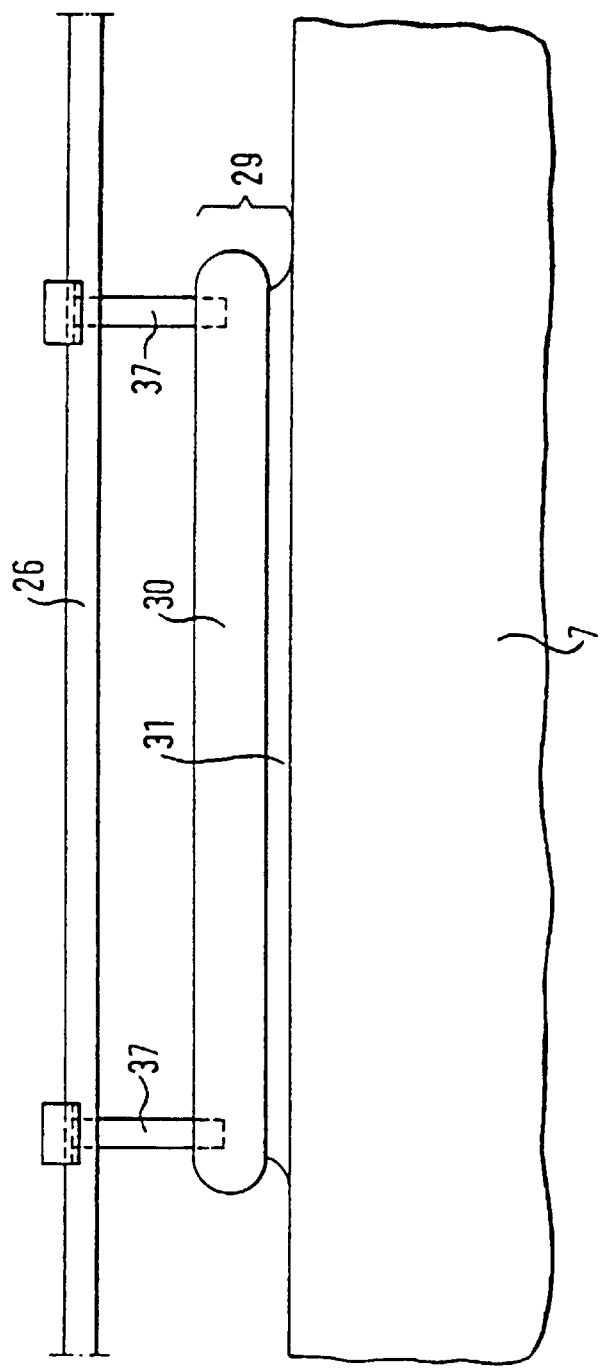
FIGS. 10a and 10b show a side view (FIG. 10a) and a cross sectional view (FIG. 10b) of an attachment of the pane to the transport rope by means of a transport hook.
Figure 10B:
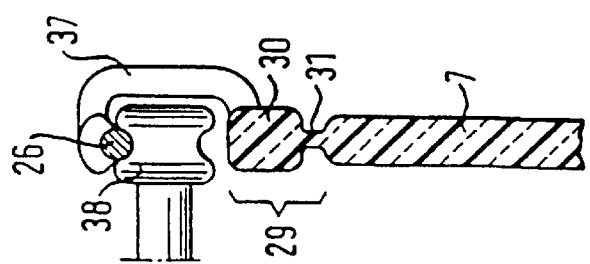

FIGS. 10a and 10b show a variation of the device according to the invention with transport rope. Provisions are made here for transport hooks 37 which embrace the transport rope 26 from above and on which the sprue is attached. The transport rope 26 with the transport hook 37 are guided over rolling elements 38. The number of transport hooks 37 or sprue elements 36 depends on the weight of the pane 7 after the last work station.

What is claimed is:

1. Device for receiving and transporting molded parts made in cavities through a production line with several work stations, with one or more of the work stations including molds made of mold halves for forming the cavities, comprising a plurality of transfer frames that support the molded parts and remain outside a contour of a respective mold passing through the production line, transport devices for moving the transfer frames through the processing line, one or more retaining elements disposed on each transfer frame, recesses formed in the molds in the area of the retaining elements, so that the retaining elements effect a form-fitting seal with mating surfaces of the mold halves when the mold is closed, wherein the retaining elements so extend into a space between the mating surfaces as to bond with the molded part when making the molded part, and wherein a respective transfer frame. the retaining elements and the molded part form a unit, wherein this unit is removed from a respective work station and moved through the production line as a unit, and wherein for each molded part a new empty transfer frame is procured and provided at the beginning of the production line, so that always a new unit is formed of the transfer frame, the retaining elements and the molded part and moved as a unit through the production line.

2. Device according to claim 1, wherein the transport devices are selected from the group consisting of hydraulic and/or pneumatic piston and cylinder units, electric motors with pinions and/or toothed racks, a tackle, a chain block, and gripper arms.

3. Device according to claim 1, further including a linear guide on which the transfer frames are movable.

4. Device according to claim 3, wherein the linear guide is implemented by one or more guide rails, and wherein the transfer frames include in the area of the guide rails recesses having a cross section which corresponds to a cross section of the pertaining guide rail.

5. Device according to claim 3, wherein the linear guide is implemented by one or more guide rails, with each of the guide rails including a recess, and wherein the transfer frames are shaped in the area of the guide rails in correspondence to the recesses of the guide rails and engage therein.

6. Device according to claim 2, wherein the gripper arms include grippers in the form of gripping pliers or vacuum suction members.

7. Device according to claim 2, further including a linear guide on which the gripper arms are shiftable.

8. Device according to claim 7, wherein the linear guide is implemented by one or more guide rails, and wherein the gripper arms have in the area of the guide rails recesses of a cross section which corresponds to a cross section of the pertaining guide rail.

9. Device according to claim 7, wherein the linear guide is implemented by one or more guide rails, with each of the guide rails including a recess, and wherein the gripper arms are shaped in the area of the guide rails in correspondence to the recesses of the guide rails and engage therein.

10. Device according to claim 1, further including means for ejecting the molded parts from at least one of the mold halves while the at least one mold half is stationary or moving.

11. Device according to claim 3, wherein the linear guide includes in the area of the mold halves one or more segments which are movable orthogonal to a separation plane of the mold halves.

12. Device according to claim 11, wherein the segments of the linear guide are configured in the area of the mold halves in the form of a compound table.

13. Device according to claim 3, wherein the linear guide is configured as linear ball bearing guide.

14. Device according to claim 1, wherein the retaining elements include on their side proximate to the molded part one or more pointed ends having a cylindrical or an elongated cross section and are embraced by the molded part.

15. Device according to claim 1, wherein the retaining elements include on their side proximate to the molded part one or more tongue shaped pointed ends which are embraced at least partially by the molded part.

16. Device according to claim 1, wherein the retaining elements include on their side proximate to the molded part one or more recesses.

17. Device according to claim 1, wherein the retaining elements include on their side proximate to the molded part one or more pins, wherein the longitudinal axis of the pins extends substantially orthogonal to a separation plane of the mold halves, and wherein the pins have a part which projects out of the retaining element and is embraced by the molded part.

18. Device according to claim 1, wherein the retaining elements are slidingly supported in the transfer frame so as to be movable away from and detachable from the molded part.

19. Device according to claim 18, and further comprising means for moving the retaining elements.

20. Device for receiving and transporting molded parts made in cavities through a production line with several work stations, with one or more of the work stations including molds made of mold halves for forming the cavities, comprising one or more circulating linear transport systems which extend through the cavities, so as to realize a bond with the molded parts when producing the molded parts, wherein the linear transport systems have an essentially cylindrical cross section and are removed together with the molded parts from the respective work station and moved onward on the production line, wherein the molds, which form the cavities, are provided in the area of the linear transport systems with recesses corresponding to the cross section of the linear transport systems so as to effect a form-fitting seal with mating surfaces of the mold halves when the mold is closed, and wherein in the region where the molded parts are connected with the linear transport systems, the linear transport systems are partially surrounded across their cross section by the molded part.

21. Device according to claim 20, wherein the one or more circulating linear transport systems include rods mounted to a conveyor, and the rods bond with the molded parts during production of the molded parts.

22. Device according to claim 20, wherein the one or more circulating linear transport systems include a flexible member.

23. Device according to claim 20 wherein one or more intermediate pieces are attached between the molded parts and the one or more linear transport systems.

24. Device according to claim 20, further including means for ejecting the molded parts from the mold half when the mold half is stationary or moving.

25. Device according to claim 20, further including one or more lifting elements adapted to move the one or more linear transport systems orthogonal to a transport direction of the one or more linear transport systems.

26. Device according to claim 4, wherein the cross section of the recesses of the transfer frames is T-shaped.

27. Device according to claim 5, wherein the cross section of the recesses of the guide rails is T-shaped.

28. Device according to claim 6, wherein the grippers are gripping pliers or vacuum suction devices.

29. Device according to claim 8, wherein the cross section of the recesses of the gripper arms is T-shaped.

30. Device according to claim 16, wherein the recesses on the side proximate to the molded part include a centering groove or a centering ridge located in the recesses.

31. Device according to claim 19, wherein the means for moving the retaining elements include at least one of a piston and cylinder unit and a mechanical adjustment element disposed in the transfer frame.

32. Device according to claim 21, wherein the conveyor includes a chain conveyor or a rope.

33. Device according to claim 22, wherein the flexible member includes a rope.

34. Device according to claim 7, wherein the linear guide includes in the area of the mold halves one or more segments which are movable orthogonal to a separation plane of the mold halves.

35. Device according to claim 34, wherein the segments of the linear guide are configured in the area of the mold halves in the form of a compound table.

* * * * *